United States Patent
Braunheim

(10) Patent No.: US 11,179,658 B2
(45) Date of Patent: Nov. 23, 2021

(54) FILTER DEVICE

(71) Applicant: Mahle International GmbH, Stuttgart (DE)

(72) Inventor: Michael Braunheim, Goeppingen (DE)

(73) Assignee: Mahle International GmbH

( * ) Notice: Subject to any disclaimer, the term of this patent is extended or adjusted under 35 U.S.C. 154(b) by 13 days.

(21) Appl. No.: 16/307,477

(22) PCT Filed: May 15, 2017

(86) PCT No.: PCT/EP2017/061608
§ 371 (c)(1),
(2) Date: Jan. 9, 2020

(87) PCT Pub. No.: WO2017/211541
PCT Pub. Date: Dec. 14, 2017

(65) Prior Publication Data
US 2020/0155982 A1 May 21, 2020

(30) Foreign Application Priority Data
Jun. 6, 2016 (DE) .......................... 102016209919.1

(51) Int. Cl.
*B01D 29/96* (2006.01)
*B01D 29/11* (2006.01)
(Continued)

(52) U.S. Cl.
CPC .............. *B01D 29/96* (2013.01); *B01D 29/11* (2013.01); *B01D 2201/291* (2013.01); *B01D 2201/4007* (2013.01)

(58) Field of Classification Search
CPC .. B01D 29/96; B01D 35/16; B01D 2201/291; B01D 2201/4007
See application file for complete search history.

(56) References Cited

U.S. PATENT DOCUMENTS 3,595,398 A   7/1971   Cook
8,920,650 B2  12/2014  Stifel et al.
(Continued)

FOREIGN PATENT DOCUMENTS

DE        10353424 A1    6/2005
DE    102008049006 A1    4/2010
(Continued)

OTHER PUBLICATIONS

English abstract for DE-102008049006.
English abstract for DE-10353424.

*Primary Examiner* — Benjamin M Kurtz
(74) *Attorney, Agent, or Firm* — Fishman Stewart PLLC

(57) ABSTRACT

A filter device comprises a filter housing having a filter housing cup and a filter housing cover. An insert insertable into the filter housing comprises an eccentrically arranged and axially projecting first positioning element configured to engage a positioning contour on a side of the filter housing cup. A guide ramp is provided on the filter housing cup and interacts with a guide device arranged on the insert. The guide ramp is formed of at least one ring segment and extends continuously over at most 270°, and the guide device has a second positioning element. At least one web is arranged on the insert and forms the second positioning element, and the at least one web comprises at least two webs with different axial longitudinal extents arranged one of on the lower end plate of the insert and directly on the insert.

18 Claims, 3 Drawing Sheets

(51) Int. Cl.
*B01D 35/16* (2006.01)
*B01D 35/153* (2006.01)

(56) References Cited

U.S. PATENT DOCUMENTS

| | | |
|---|---|---|
| 9,254,456 B2 | 2/2016 | Ardes |
| 9,320,992 B2 | 4/2016 | Braunheim |
| 2009/0230048 A1* | 9/2009 | Braunheim .......... B01D 35/153 210/236 |
| 2012/0267293 A1 | 10/2012 | Ardes |
| 2014/0183116 A1* | 7/2014 | Ardes .................... B01D 29/88 210/234 |
| 2015/0367265 A1* | 12/2015 | Grass .................... B01D 35/30 210/232 |

FOREIGN PATENT DOCUMENTS

| | | |
|---|---|---|
| DE | 102009030503 A1 | 12/2010 |
| DE | 102011077798 A1 | 12/2012 |
| EP | 2490786 A1 | 8/2012 |
| EP | 2547415 A1 | 1/2013 |
| WO | 0130480 A1 | 5/2001 |
| WO | 2011047913 A1 | 4/2011 |
| WO | 2011113723 A1 | 9/2011 |

* cited by examiner

FILTER DEVICE

CROSS-REFERENCE TO RELATED APPLICATION

This application claims priority to German Patent Application No. DE 10 2016 209 919.1, filed on Jun. 6, 2016, and International Patent Application No. PCT/EP2017/061608, filed on May 15, 2017, both of which are hereby incorporated by reference in their entirety.

TECHNICAL FIELD

The present invention relates to a filter device with a filter housing having a filter housing cup and a filter housing cover, in which filter housing an insert is arranged, according to the introductory clause of Claim 1.

BACKGROUND

From EP 2 490 786 B1 a generic filter device is known, with a filter housing having a filter housing cup and a filter housing cover, in which filter housing a ring filter element is arranged, which has on a lower end plate an eccentrically arranged and axially projecting pin, by means of which it engages, when the filter device is installed, into a channel, in particular an idling channel, on the filter housing cup side. Furthermore, a guide ramp is provided on the filter housing cup, which guide ramp interacts with a guide device arranged on the ring filter element.

From DE 103 53 424 B4 a filter device is also known with a cup-shaped lower filter housing and with a screw cover able to be screwed onto the lower filter housing via a circumferential thread and able to be close the lower filter housing. In the filter housing, an insert is arranged here, which is able to be connected to the screw cover in a frictionally engaged manner rotatably via an axial latching closure, and has on its face side, associated with the base of the lower filter housing, an eccentrically arranged pin.

From DE 10 2008 049 006 A1 a filter device is known, with a filter housing cup, a filter housing cover and a filter housing, in which an insert is arranged. The insert has an end plate, an eccentrically arranged and axially projecting first positioning element, by means of which, when the filter device is installed, it engages into a positioning contour on the filter housing cup side. On the filter housing cup furthermore a guide ramp is provided, which interacts with a guide device arranged on the end plate.

In modern engine compartments of motor vehicles, increasingly less installation space is freely available, so that attempts are always being made to make new use of installation space for the arrangement of components which was hitherto not made use of. In filter devices known from the prior art, for example a guide ramp arranged in the filter housing cup is provided, which ramp runs from a high point in an annular manner about almost 360° to a low point and an idling channel adjoining thereto. If in this filter housing cup a ring filter element is inserted and is rotated with the filter housing cover during screwing-on, then the ring filter element slides via its pin usually along the guide ramp until it engages with its pin in a sealing manner into the idling channel. However, a disadvantage in such a system is that the guide ramp is formed so as to be almost closed in an annular manner and thereby occupies a complete base region of the filter housing cup, which in this case is not able to be used for other components.

SUMMARY

The present invention is therefore concerned with the problem of indicating for a filter device of the generic type an improved or at least an alternative embodiment, which overcomes the disadvantages known from the prior art.

This problem is solved according to the invention by the subject of the independent Claim 1. Advantageous embodiments are the subject of the dependent claims.

The present invention is based on the general idea of no longer forming in an almost closed annular shape a guide ramp for advancing a first positioning element, in particular a pin or a rib, projecting eccentrically and axially from a lower end plate of an insert or from the insert itself, but rather of forming said guide ramp only in the manner of a ring segment, wherein the guide ramp according to the invention extends continuously over at most 270°, so that at least between a positioning contour on the housing side, for example a channel or a recess, in particular a slot, and the guide ramp, an installation space still remains which is hitherto not used or respectively occupied by the guide ramp, which space is now able to be used for the first time for the arrangement of further components. The filter device according to the invention, which is configured for example as an oil or fuel filter, has here a filter housing having a filter housing cup and a filter housing cover, in which filter housing the previously mentioned insert is arranged. On this insert, for example a ring filter element, or on its lower end plate, the eccentrically arranged and axially projecting first positioning element, for example the pin or the rib, is provided here, by means of which, when the filter device is installed, it engages into the positioning contour on the filter housing cup side, for example a channel or a recess, in particular a slot, wherein a guide ramp is provided on the filter housing cup, which guide ramp interacts with a guide device arranged on the insert. According to the invention, the guide ramp is formed in the manner of a ring segment and extends continuously over at most 270°. As already mentioned in the introduction, it is possible hereby for the first time to use the region, which is no longer occupied by the guide ramp and has become free, for the arrangement of additional components, such as for example for the arrangement of a pump, a valve, a thermostat or a heater. Hereby, it is possible to create a compact construction compared to filter devices hitherto, which uses for the first time the installation space which was not used up to now. According to the invention, the guide device has a second positioning element, wherein on the insert at least one web is arranged, which forms the second positioning element. Here at least two such webs with different axial longitudinal extents are arranged on the lower end plate of the insert or directly on the latter. A further important advantage can be that with a position-oriented installation of the insert a targeted influencing of the flow can take place through additional ribs or other flow-directing elements on the insert, housing or through additional components. The aim of the targeted influencing can be, for example, that cold and warm media from different inflow sites are mixed better, or respectively that the dwell time of warm fuel in the filter region is extended and thus the blocking of the insert/filter element owing to paraffin precipitations from the cold fuel is prevented.

The guide device has here at least two positioning elements. A second positioning element can be, for example, a web on the insert. Hereby, it is possible to insert the insert into the filter housing cup irrespective of its angular position with respect to its vertical axis, wherein either the first positioning element or else at least the second positioning element, i.e. for example the web, runs along on the ring segment-like guide ramp and thereby brings about the guidance of the first positioning element, for example of the pin, to the positioning contour, for example a channel. This also guarantees that for the case in which the insert is inserted into the filter housing cup in such a way that the first positioning element does not sit on the guide ramp, the second positioning element, i.e. for example the at least one web, undertakes the guiding function and guides the first positioning element reliably to the positioning contour, for example the channel, on the filter housing cup side.

When the first positioning element is configured as a pin and the positioning contour as a channel, and when in addition the pin is arranged aligned to the channel, the at least one web, i.e. the second positioning element, has no more contact with the guide ramp, and the pin can therefore be inserted via its introduction chamfer in a centred manner in the channel and downwards into this. The filter housing cover can be readily used here as an installation aid, because it limits the maximum inclination of the insert in the filter housing cup during the installation. Thus, the insert can be inserted indiscriminately into the filter housing, the filter housing cover can be placed on and screwed in. The positioning of the pin relative to the channel, or respectively the introducing of the pin into this channel, takes place here without further intervention.

It is the case here that the insert can be positioned by the first positioning element (e.g. pin), which has, at the same time, an idling function when it is drawn out from the pin mount or respectively from the channel. The insert can also be positioned here by a first positioning element which has no idling function. Then, there is no channel, but rather only a corresponding positioning contour. Alternatively, it is also conceivable that the insert has as first positioning element a rib, and the positioning contour is formed as a slot in the housing, then the first positioning element is not round and the positioning contour is not a channel. The slot in the housing can also be very wide, so that the positioning takes place with two positioning elements, for example ribs, which have a corresponding spacing. Then two shoulders interact with two ribs as positioning elements, which are not round.

In an advantageous further development of the solution according to the invention, the guide device is formed in one piece with the lower end plate of the insert. Irrespective of the configuration of the guide device or respectively of the positioning elements, i.e. irrespective of whether these are configured as a pin, rib or as a web, it is therefore possible to produce the guide device at a favourable cost and, at the same time, in a high quality and in a simple manner with regard to manufacture.

In a further advantageous embodiment of the solution according to the invention, the guide ramp is also formed in the manner of a ring segment, but extends continuously over at most 180°. Hereby, a further shortening of the guide ramp in circumferential direction is possible, whereby further installation space can be made use of for the arrangement of additional components. Of course, it is also conceivable here that the guide ramp is configured so as to be interrupted over several ring segments and the entire circumferential length of the individual ring segments extends here over at most 270°, preferably over at most 180°. Hereby, it is possible in particular to arrange additional components at almost any desired intermediate locations.

In a further advantageous embodiment of the solution according to the invention, the guide ramp has a high point and a low point, arranged in the region of the positioning contour, for example the channel. Alternatively hereto, it is also conceivable that the guide ramp has a high point and ramp segments sloping on both sides, wherein a low point is arranged in the region of the positioning contour, for example the channel. In the case of a ramp sloping only on one side, this, in interaction with the guide device on the insert side, brings about a reliable feeding of the pin to the channel, i.e. of the first positioning element to the positioning contour. In the case of segments sloping on both sides and in the case of filter housing covers with a fine thread, it can be necessary to briefly rotate the filter housing cover contrary to the screwing direction, whereby the thread finds itself and the insert can be positioned without further intervention. The filter housing cover can then be screwed on. Only when in this case the first positioning element reaches the positioning contour, i.e. the pin reaches the channel, and dips into the latter, the thread engages and the insert is pressed via the thread pitch by the filter housing cover into its final position. Hereby, a damage to the insert can be reliably prevented.

Expediently in the region of the filter housing cup which is not occupied by the guide ramp, an additional component, such as for example a heater, a thermostat, a pump, a valve or a line, is arranged. This non-conclusive list already suggests what varied possibilities exist for the arrangement of additional component through the guide ramp extending only in the manner of a ring segment over a partial region of the circumference.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are represented in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 5:
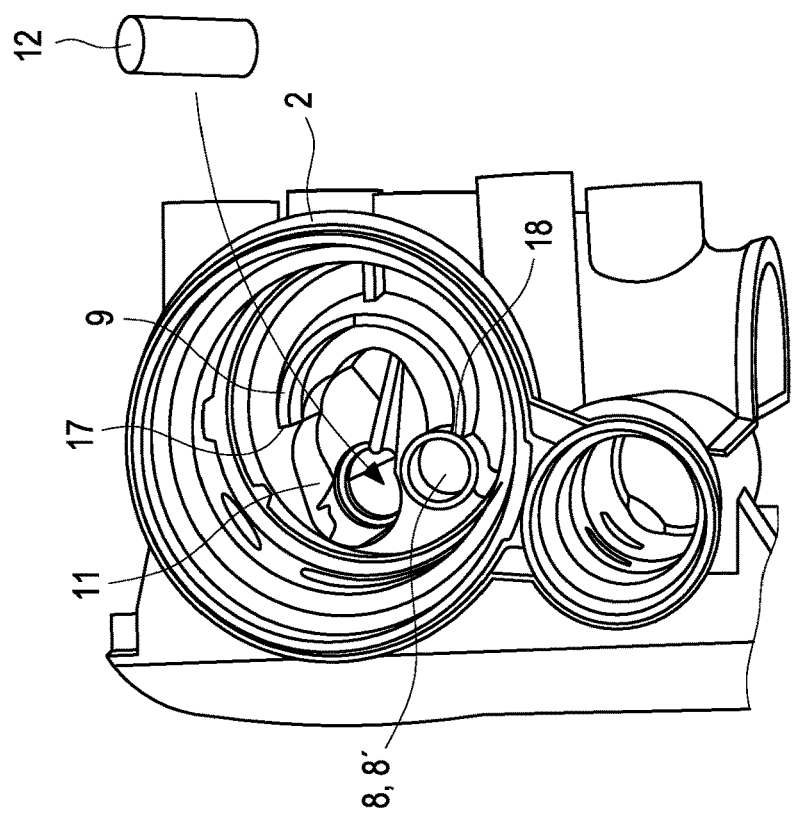
FIG. 5 illustrates a view from above onto a filter housing cup.

According to FIGS. 1 to 4, a filter device 1 according to the invention, which can be configured for example as an oil or fuel filter, has a filter housing 4 having a filter housing cup 2 and a filter housing cover 3, in which filter housing an insert 5, for example a ring filter element 5', is arranged. In the following, the insert 5 is always designated here as ring filter element 5', wherein it is of course also conceivable that the latter, as is illustrated in FIGS. 1 to 4 and 6, is merely a screen insert. This means that in the entire application the term "ring filter element" could be replaced by the term "insert", without departing from the scope of the invention. On the ring filter element 5' or respectively on its lower end plate 6, an eccentrically arranged and axially projecting first positioning element 13 is provided, by means of which, when the filter device 1 is installed, it engages into a positioning contour 8 on the filter housing cup side, wherein on the filter housing cup 2 a guide ramp 9 is provided, which interacts with a guide device 10 arranged on the ring filter element 5'. According to FIGS. 1 to 6, the first positioning element 13 is configured here as a pin 7, and the positioning contour 8 is configured as a channel 8'. On the lower end plate 6 of the ring filter element 5' in the FIGS. 1 to 6 which are shown, therefore an eccentrically arranged and axially projecting pin 7 is provided which, when the filter device 1 is installed, engages in a sealing manner into a channel 8' on the filter housing cup side, in particular an idling channel. On the filter housing cup 2 here a guide ramp 9 is provided, which interacts with a guide device 10 arranged on the filter element 5' (insert 5). According to the invention, the guide ramp 9 is now formed in the manner of a ring segment and extends continuously over at most 270°, preferably even over at most 180° (cf. FIG. 5). Provision can also be made that the guide ramp 9 is configured so as to be interrupted and has at least two ring segments which together extend over at most 180°. Hereby it is possible to occupy the installation space 11, which is now not occupied by the guide ramp 9 (cf. FIG. 5), with other additional components 12, for example with a heater, a thermostat, a pump, a valve or a line.

Observing FIGS. 1 to 4 and 6 further, it can be seen that the guide device 10 has at least two positioning elements 13, 14, wherein for example the pin 7 forms one of the two positioning elements 13. On the ring filter element 5' furthermore a web 15 is arranged, which forms the at least one second positioning element 14. Of course, several such webs 15 (cf. FIG. 6) with different axial longitudinal extents can also be arranged on the lower end plate 6 of the ring filter element 5' or directly on the latter. Via such webs 15 or respectively ribs also with a positionally oriented installation of the insert 5, a targeted influencing of the flow can take place through additional ribs or other flow-directing elements on the insert 5, housing 4 or through additional components. The aim of the targeted influencing can be, for example, that cold and warm media from different inflow sites are mixed better, or respectively that the dwell time of warm fuel is extended in the filter region and thus the blocking of the insert/ring filter element 5,5' owing to paraffin precipitations from the cold fuel is prevented.

With the guide device 10 according to the invention, the positioning elements 13, 14 and the associated guide ramp 9 it is possible, irrespective of a rotation angle position of the ring filter element 5' about a vertical axis, to incorporate this reliably into the filter housing 4 and, in so doing, to guarantee that the first positioning element 13, i.e. in the present case the pin 7, dips into the positioning contour 8, i.e. into the channel 8'. Depending on the rotation angle position, at least one of the positioning elements 13, 14 of the guide device 10 is in contact where with the guide ramp 9, up to the point in time at which the pin 7 engages into the channel 8'. At this point in time, none of the positioning elements 13, 14 has contact to the guide ramp 9 any longer.

In order to be able to construct the guide device 10 at as favourable a cost as possible, this is preferably produced in one piece with the lower end plate 6 of the ring filter element 5', for example in a shared plastic injection moulding process. At an upper end of the ring filter element 5', a detent contour 16 is provided, which is able to be latched with a counter-detent contour 21 on the filter housing cover 3, whereby the ring filter element 5' together with the filter housing cover 3 is able to be removed from the filter housing cup 2. The detent contour 16 can be configured here, at the same time, also as a sealing contour.

Observing FIGS. 1 to 5 further, it can be seen that the guide ramp 9 has a high point 17 and a low point 18 arranged in the region of the positioning contour 8, i.e. of the channel 8', so that with a twisting of the ring filter element 5', which can also be configured for example as a simple screen insert, the positioning element 13, i.e. for example the pin 7, is automatically delivered to the positioning contour 8, for example the channel 8'. The guide ramp 9 can be formed here with different zones, so that for example the guide ramp 9 in the region of the high point 17 firstly has an inclination of zero, in the region of the low point 18 an inclination of 14-20°, preferably approximately 11.2°, and between the high point 17 and the low point 18 an inclination of between 20 and 29°, preferably 16.5°. Alternatively, a guide ramp 9 is also conceivable, which has a central high point 17 and ramp segments sloping on both sides, wherein also in this case a low point 18 is arranged in the region of the positioning contour 8, for example the channel 8'.

Figure 1:
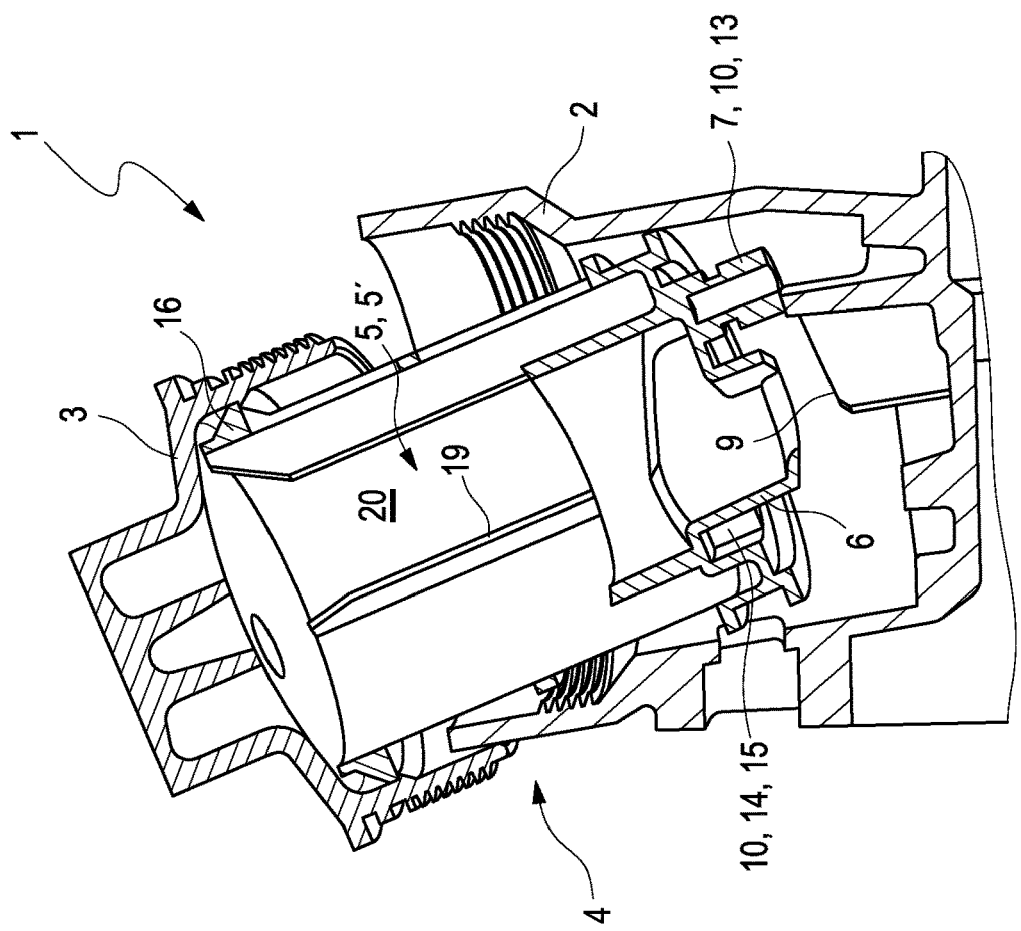
FIG. 1 illustrates a sectional illustration through a filter device according to the invention, on inserting of an insert.
Figure 2:
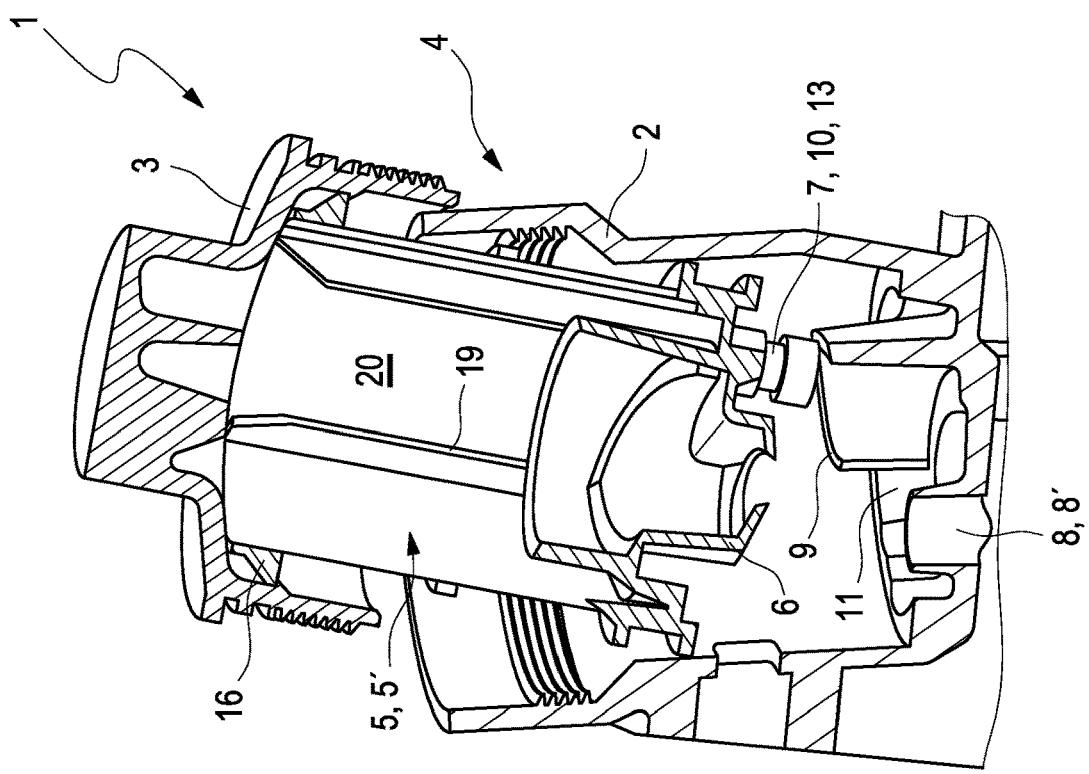
FIG. 2 illustrates an illustration as in FIG. 1, but with a different position of the insert.
Figure 3:
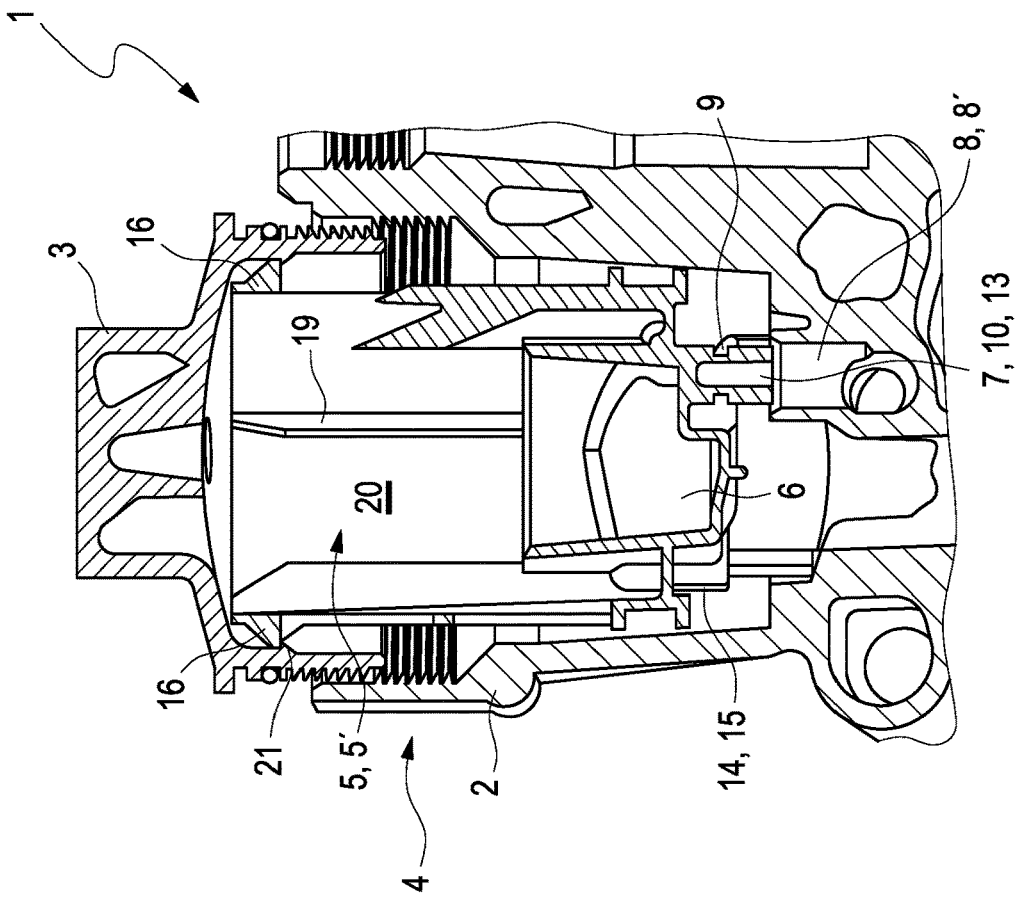
FIG. 3 illustrates a sectional illustration through the filter device according to the invention with positioning elements sliding on a guide ramp.
Figure 4:
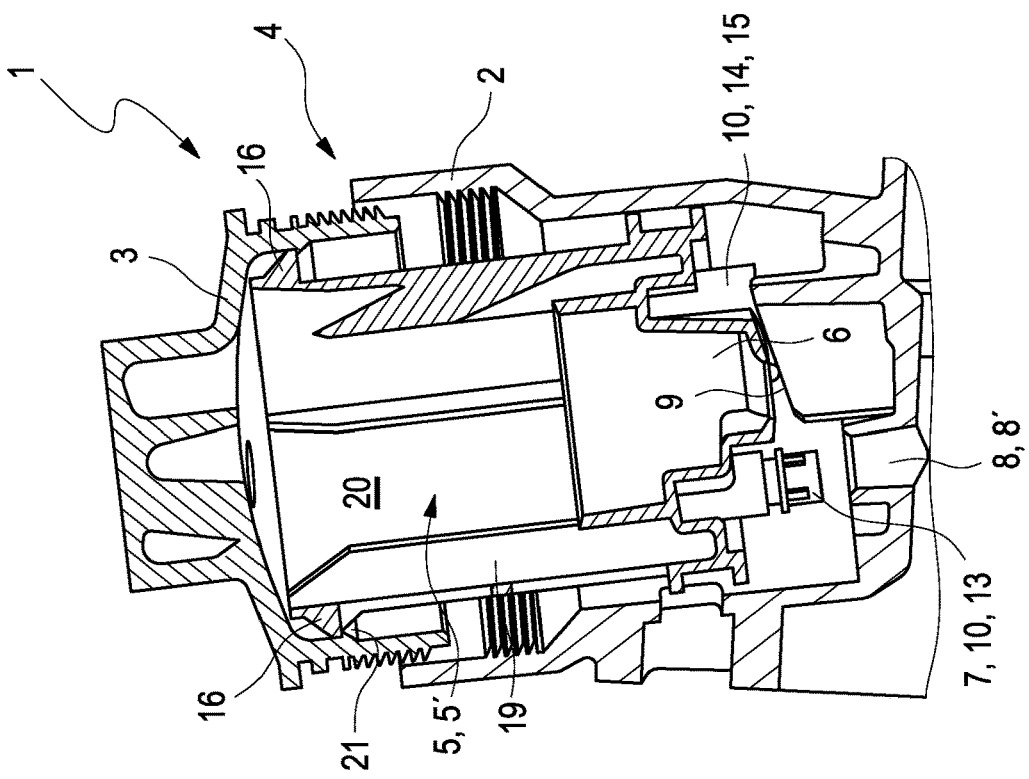
FIG. 4 illustrates an assembly step following FIG. 3, in which a pin is already aligned flush to an idling channel.
Figure 6:
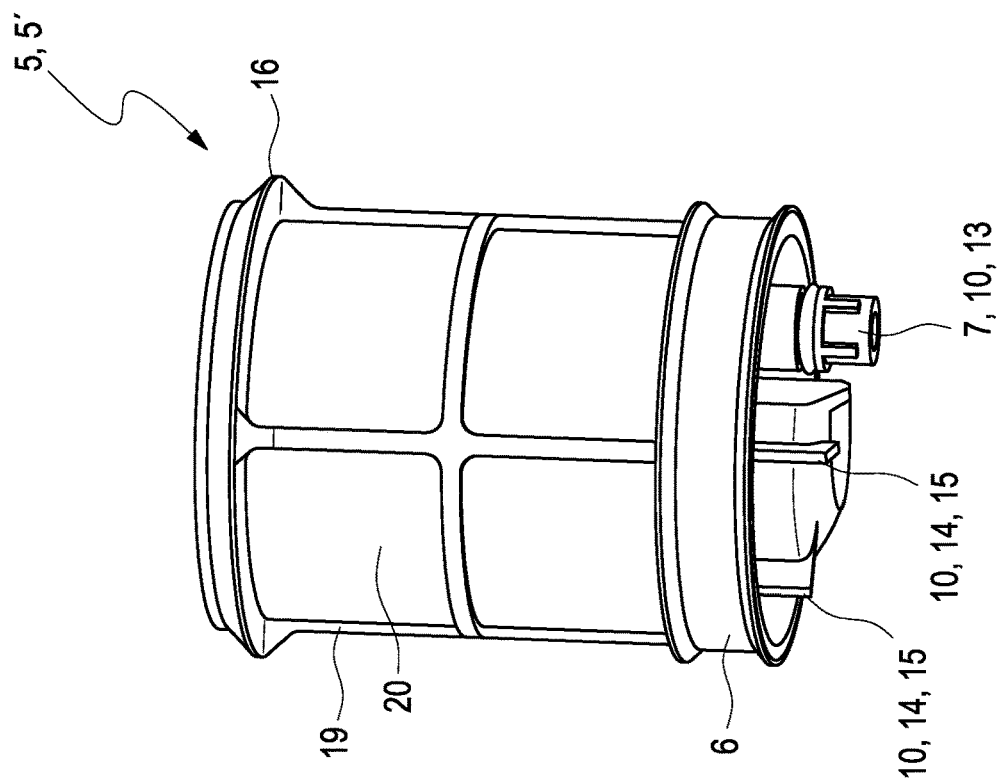
FIG. 6 illustrates an insert in a side view.

Observing again FIG. 6, a view is shown there onto a ring filter element 5' according to the invention, which in the present case and according to FIGS. 1 to 4 is configured as a screen insert and for this reason has a frame 19, which connects the detent contour 16 or respectively sealing contour arranged at the upper end with the lower end plate 6. The frame 19 supports here a screen 20. On the lower end plate 6 the eccentrically arranged and axially projecting pin 7 is arranged here, likewise two webs 15, wherein the pin 7 forms a first positioning element 13 and the webs 15 form a second positioning element 14.

With the filter device 1 according to the invention, owing to the specially connected guide device 10 with the positioning element 13, it is possible for the first time to no longer have to guide the guide ramp 9 in the filter housing cup 2 over the entire circumference, but rather to form it in the manner of a ring segment and in so doing to occupy the region 11 of the filter housing cup 2, no longer covered by the guide ramp 9, by other components 12, for example a heater, a line, a thermostat or a valve, and thereby to utilize this region 11 as installation space which was hitherto not made use of, whereby a more compact construction is possible.

The invention claimed is:
1. A filter device comprising:
a filter housing comprising a filter housing cup and a filter housing cover;
an insert insertable into the filter housing and comprising, on one of the insert and a lower end plate of the insert, an eccentrically arranged and axially projecting first positioning element configured to engage, when the filter device is installed, a positioning contour on a side of the filter housing cup, wherein a guide ramp is provided on the filter housing cup and interacts with a guide device arranged on the insert,
wherein:

the guide ramp is formed of at least one ring segment that extends continuously over at most 270° and has an extent that leads to the positioning contour,
the guide device has a second positioning element,
at least one web is arranged on the insert and forms the second positioning element,
the at least one web comprises at least two webs with different axial longitudinal extents arranged circumferentially spaced apart from one another one of on the lower end plate of the insert and directly on the insert.

2. The filter device according to claim 1, wherein the guide device is one of formed in one piece with the lower end plate of the insert and formed in one piece with the insert.

3. The filter device according to claim 1, wherein the at least one ring segment comprises a single ring segment and extends continuously over at most 180°.

4. The filter device according to claim 1, wherein the insert comprises a detent contour provided on an upper region of the insert, the detent contour configured to be latched with a counter-detent contour arranged on the filter housing cover.

5. The filter device according to claim 1, wherein one of:
the guide ramp has a high point and a low point arranged in a region of the positioning contour, and
the guide ramp has a high point and ramp segments sloping on both sides, wherein a low point is arranged in the region of the positioning contour.

6. The filter device according to claim 1, wherein the insert is configured as one of a ring filter element and a screen.

7. The filter device according to claim 1, wherein in a region of the filter housing cup not occupied by the guide ramp, an additional component is arranged, wherein the additional component comprises one of a heater, a thermostat, a pump, a valve, and a line.

8. The filter device according to claim 1, wherein one of:
the first positioning element is configured as one of a pin and a rib, and
the positioning contour is configured as one of a channel and a recess, wherein the recess comprises a slot.

9. The filter device according to claim 1, wherein the first positioning element is arranged circumferentially spaced apart from the at least two webs.

10. The filter device according to claim 1, wherein the first positioning element axially projects from the insert or the lower end plate a further axial distance than that of the at least two webs.

11. A filter device comprising:
a filter housing cup comprising:
a positioning contour on a side of the filter housing cup; and
a guide ramp comprising at least one ring segment extending continuously over at most 270°, the guide ramp having an extent that leads to the positioning contour;
an insert comprising:
a guide device configured to engage the guide ramp;
a first positioning element axially projecting from the insert and configured to engage the positioning contour;
a second positioning element including at least two webs, each web extending from a distinct insert position;
wherein the first positioning element and the second positioning element are structured and arranged to run along the guide ramp, and wherein, depending on an angular position of rotation, either the first positioning element or the second positioning element is in contact with the guide ramp until a position at which the first positioning element is aligned with the positioning contour, wherein at the position at which the first positioning element is aligned with the positioning contour neither the first positioning element nor the second positioning element is in contact with the guide ramp; and
wherein the first positioning element axially projects from a lower end plate of the insert a further axial distance than that of the at least two webs and is structured and arranged to run along the guide ramp until the first positioning element reaches the positioning contour.

12. The filter device according to claim 11, wherein the at least one ring segment comprises a single ring segment and extends continuously over at most 180°.

13. The filter device according to claim 11, further comprising a filter housing cover having a counter-detent contour arranged thereon; and
wherein the insert further comprises a detent contour provided on an upper region of the insert, the detent contour projecting radially outward from a circumferential face of the insert and configured to be latched with the counter-detent contour.

14. The filter device according to claim 11, wherein one of:
the guide ramp has a high point and a low point arranged in a region of the positioning contour, and
the guide ramp has a high point and ramp segments sloping on both sides, wherein a low point is arranged in the region of the positioning contour.

15. The filter device according to claim 11, wherein at least one of:
the insert is configured as one of a ring filter element and a screen; and
in a region of the filter housing cup not occupied by the guide ramp, an additional component is arranged, wherein the additional component comprises one of a heater, a thermostat, a pump, a valve, and a line.

16. The filter device according to claim 11, wherein one of:
the first positioning element is configured as one of a pin and a rib, and
the positioning contour is configured as one of a channel and a recess, wherein the recess comprises a slot.

17. An insert of a filter device, comprising:
an eccentrically arranged and axially projecting first positioning element disposed on a lower end plate thereof that is configured to engage a positioning contour of a filter housing cup;
a guide device provided on the insert and configured to interact with a guide ramp of the filter housing cup, the guide device comprising a second positioning element including at least one web; and
wherein the at least one web includes at least two webs with different axial longitudinal extents arranged circumferentially spaced apart from one another on the lower end plate.

18. The insert according to claim 17, wherein the first positioning element axially projects from the lower end plate a further axial distance than that of the at least two webs.

* * * * *